No. 861,997. PATENTED JULY 30, 1907.
J. LÜCK.
WAVE MOTOR.
APPLICATION FILED APR. 5, 1907.
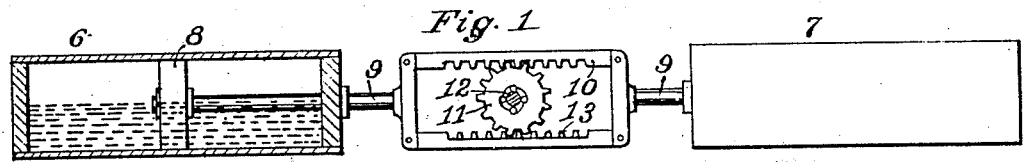
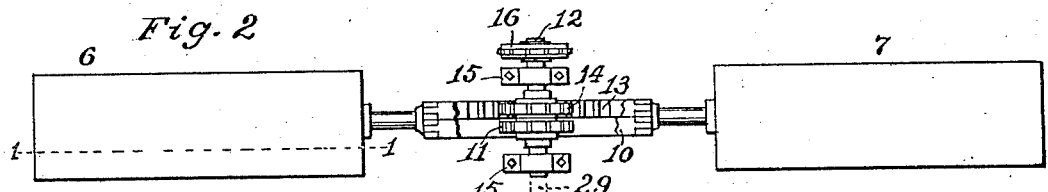
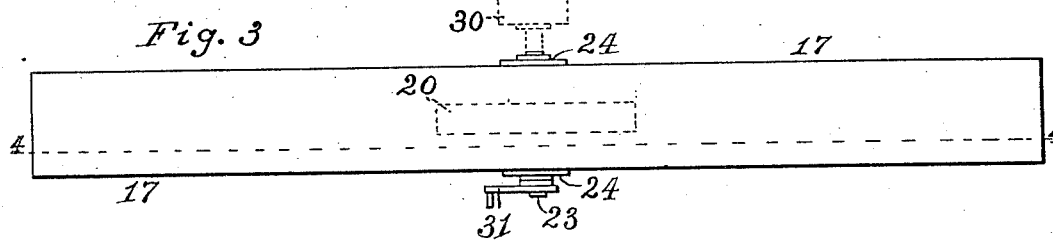
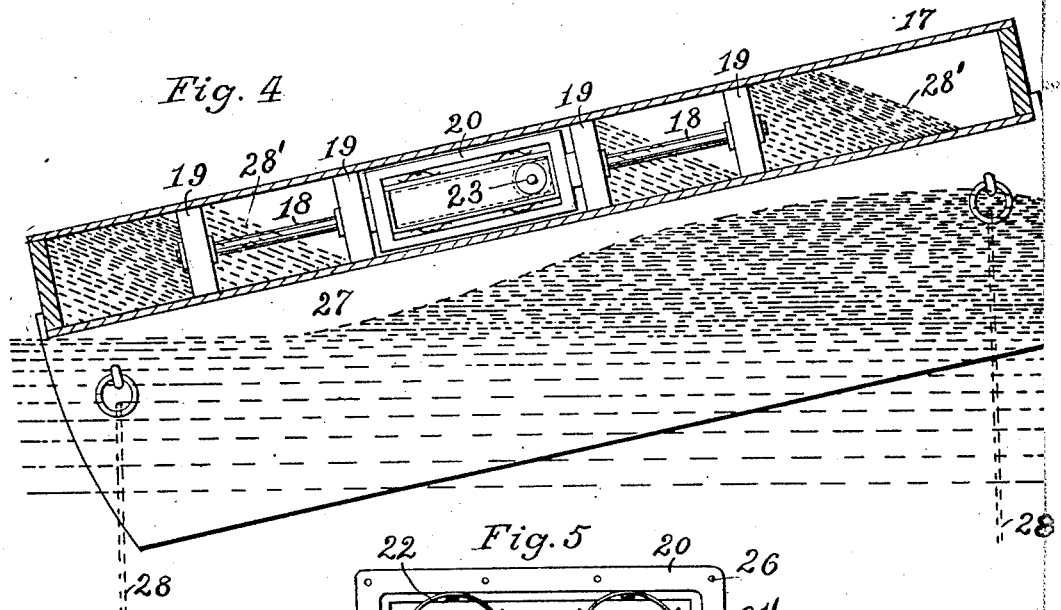
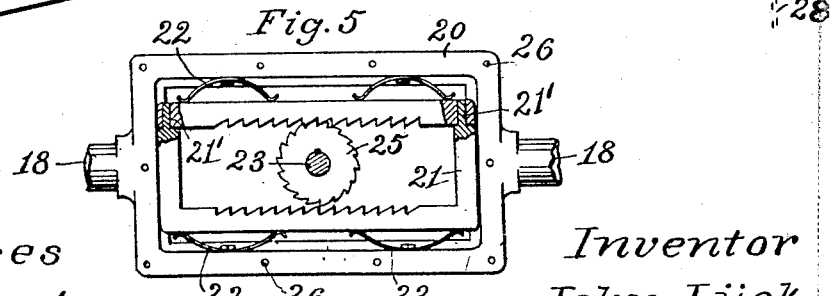
Witnesses
A. B. Decker
Gertrude Manning
Inventor
John Lück
By Delbert H. Decker
Attorney

UNITED STATES PATENT OFFICE.

JOHN LÜCK, OF BROOKLYN, NEW YORK.

WAVE-MOTOR.

No. 861,997.   Specification of Letters Patent.   Patented July 30, 1907.

Application filed April 5, 1907. Serial No. 366,586.

*To all whom it may concern:*

Be it known that I, JOHN LÜCK, a citizen of the United States, residing at Brooklyn, in the county of Kings and State of New York, have invented certain new and useful Improvements in Wave-Motors, of which the following is a specification.

This invention relates to motors and particularly to that class of motors styled as wave motors because operated by the waves of some body of water.

The principal object of this invention is to so construct and mount a motor of this class that water, or other equally mobile substance, shall be the prime mover in the motor, while the wave motion of water shall incite the prime mover to action.

To this end the invention consists in the structure and combination of parts constituting the same substantially as herein described and claimed.

In the accompanying drawings, which form a part of this specification, Figures 1 and 2 represent, in side elevation and plan, one embodiment of the invention, a portion of Fig. 1 being shown in vertical section, the plane of which section is indicated by the line 1—1, Fig. 2. Fig. 3 is a plan of another embodiment of the invention. Fig. 4 illustrates in vertical section the form of motor shown in Fig. 3, the section being taken in the plane indicated by line 4—4. This figure also shows the motor, mounted upon a float, in operation. Fig. 5 is a detail elevation of the form of power transmitting mechanism used in the form of motor represented in Figs. 3 and 4.

The principal purpose of this invention is to utilize water or some other equally mobile substance as the prime mover in developing power from wave motion and it may be accomplished by employing an oblong receptacle located on, or parallel to, the deck of a floating body of any sort, and containing a piston or other movable partition, which shall slide with the confined liquid towards one end or the other of the receptacle as the waves tilt the floating body. Obviously various forms of mechanisms may be devised and used in the accomplishment of this purpose, and the motor, in whatever form, may be mounted upon any float in expanses of water where waves are usually present. It may be mounted upon the deck of a vessel and power taken from it and utilized to propel the vessel or for any other desired purpose, or it may be mounted upon a float suitably anchored, and the power transmitted from the float to the shore in any desirable manner.

In Figs. 1 and 2, two boxes or tubes 6 and 7, rectangular or circular in cross section as desired, are represented located in alinement. In each there is a piston as 8, and these pistons are connected by a suitable piston rod 9, in the middle of which between said boxes, is inserted a rectangular frame. The front half of the upper side of the frame is composed of a toothed rack 10, which meshes with a ratchet pinion 11 mounted on the shaft 12 and the rear half of the lower side of the frame consists of a toothed rack 13, which meshes with a ratchet pinion 14, mounted at the side of pinion 11 upon shaft 12. These pinions may be connected to the shaft by the well known ball ratchet as shown in Fig. 1 or by any other form of ratchet mechanism. The shaft 12 may be supported in any suitable bearings, ordinary pillow blocks being indicated at 15. The power from this shaft may be taken off in any desirable manner as by sprocket gearing, the gear wheel of which upon said shaft is indicated at 16.

In the embodiment of the motor as seen in Figs. 3 and 4, one continuous box or tube is represented at 17 and in it is located a piston rod as 18, upon which are pistons 19, two at each end, and in the middle of the piston rod is the rectangular frame 20, and within this frame is a ratchet frame 21, against whose sides bear springs 22, whose tendency is to centralize the frame 21. Passing transversely through the box 17 is the power shaft 23, which may be journaled in bearings secured to the sides of said box as indicated at 24. Upon this shaft is keyed a toothed wheel 25, which may mesh alternately with the upper and lower racks of the frame 21, whereby the shaft 25 will always be rotated in the same direction. These racks may be permitted to move independently of one another as by means of mortises and tenons, seen at 21′. The face-plate used for retaining the frame in place, has, for the sake of clearness, been omitted from Fig. 5. It may be secured to the frame 20 by any suitable means, as by screws passing through it into the holes indicated at 26.

For the sake of more fully disclosing the operation of this motor, a float has been represented in Fig. 4 at 27, which float may be anchored in any suitable way, as indicated by cables shown in dots at 28. This float may likewise be considered as representing a vessel. In either case the tube 17 would be extended lengthwise of the vessel or other floating body. In the tube or box water is placed approximately filling half full the compartments between the ends of the box and the pistons and between the pistons themselves. Then as one end of the float is elevated by the wave movement of the water on which it rides, the water as indicated in said compartments at 28′, will rush towards the lower end of the tube and carry with it the pistons 19 and likewise the frame 21. As the frame 21 passes from right to left its upper rack bar will engage the teeth of wheel 25, while the teeth of the lower rack bar will ride over those of the wheel. Then as the float tips in the opposite direction under the action of the waves, the confined water will rush to the other end of the tube and, as the frame 21 moves from left to right, the teeth of the upper rack bar will ride over the teeth of the wheel, and the teeth on the lower side of the wheel will engage with the teeth of the lower rack bar, whereby said wheel will be rotated in the same direction as before. Substantially this same action takes place in the form of motor shown in Figs. 1 and 2, wherein as water flows to the left, the upper rack 10 will rotate its ratchet pinion 11 freely about the shaft 12, but the rack 13 will cause its ratchet pinion 14 to grip the shaft 12 and rotate said shaft. Then as the water flows to the right, the upper rack 10 will cause its ratchet pinion 11 to grip the shaft 12 and rotate it in the same direction as before, while the ratchet pinion 14 moves freely about the shaft.

Any number of pistons may be employed and the tubes may be of any desired length. A number of motors may be located side by side if desired, substantially as indicated in Figs. 2 and 3, and a common shaft used therefor as indicated in dotted lines at 29 and upon this shaft may be mounted a pulley as 30, from which the power may be taken. As stated above, the power may be taken off the motor shaft in any manner desired, as from a sprocket wheel 16, a band pulley 30 or a crank as indicated at 31.

It will be noted that the present invention combines with a floating body, a wave motor comprising means supported on the floating body and movable relatively thereto by the wave action and means connected with said first named means for transmitting power therefrom; and that in the present case the movement of the first named means (i. e. the piston) is in a right or straight line and that the motion is changed to rotary motion through the described connections.

The invention claimed is:—

1. In a wave motor, a movable power piston and a confined body of water actuating said piston as the waves move the motor.
2. In a wave motor, a movable power piston mounted on a floating body an operative by the waves as they tilt said body.
3. In a wave motor, a box or tube mounted on a floating body and containing a liquid, a piston or movable partition dividing said tube and movable by said liquid, and means for taking power from said piston.
4. In a wave motor, a closed receptacle mounted on a floating body, a piston or movable partition in said receptacle, means in said receptacle for moving said piston or partition, and means for taking power from said piston.
5. The combination with a wave-tilted body, of a chamber thereon partially filled with water, a piston dividing said chamber and means for taking power therefrom as the piston shifts position in said chamber.
6. The combination with a floating body, of a wave motor comprising a tube or box, a piston or movable partition in the box, a liquid confined in said box and operative to move said piston under the action of the waves, and means for taking power from said piston.
7. The combination with a floating body, of a tube or box carried thereby parallel with the deck of said body, pistons in said box and dividing it into compartments, water partially filling said compartments, a rod connected to said pistons, and a ratchet mechanism driven by said rod.
8. The combination with a floating body, of a tube or box mounted longitudinally thereof, connected pistons dividing said tube or box into compartments, water partially filling said compartments, a ratchet frame, a power shaft mounted transversely to said frame, a toothed wheel on said shaft for engaging the teeth on said frame, and means for taking power from said shaft.

In testimony whereof I have signed my name to this specification in the presence of two subscribing witnesses.

JOHN LÜCK.

Witnesses:
GEO. HADDEN,
R. W. WENTZ.